Dec. 29, 1931.  W. A. ALLEN  1,838,207
COMBINED SCREEN AND VENTILATOR
Filed Aug. 25, 1926  3 Sheets-Sheet 1
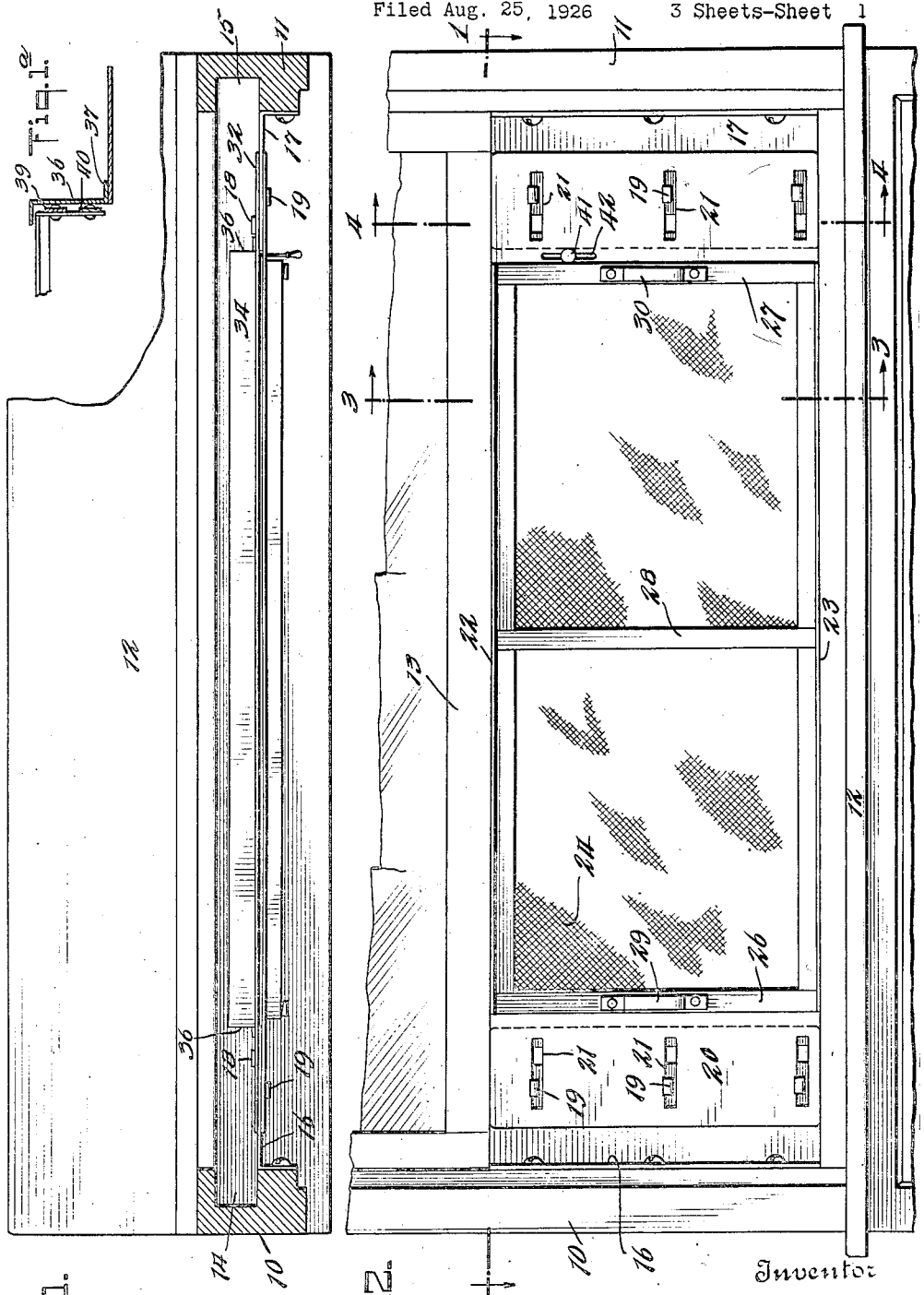
Inventor
WILLIAM A. ALLEN
By his Attorney John M. Cole

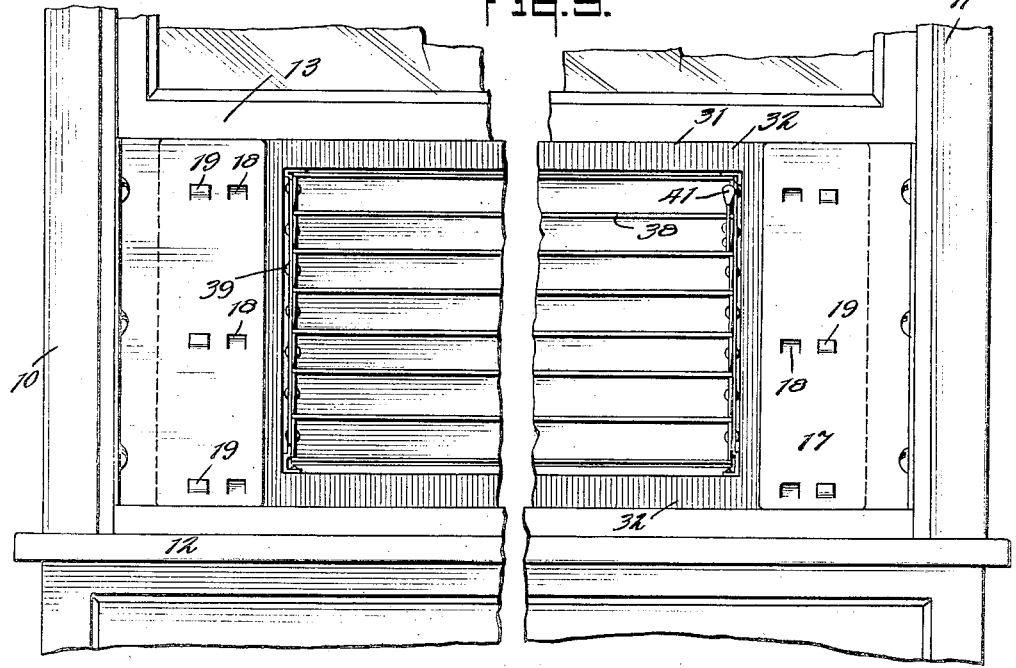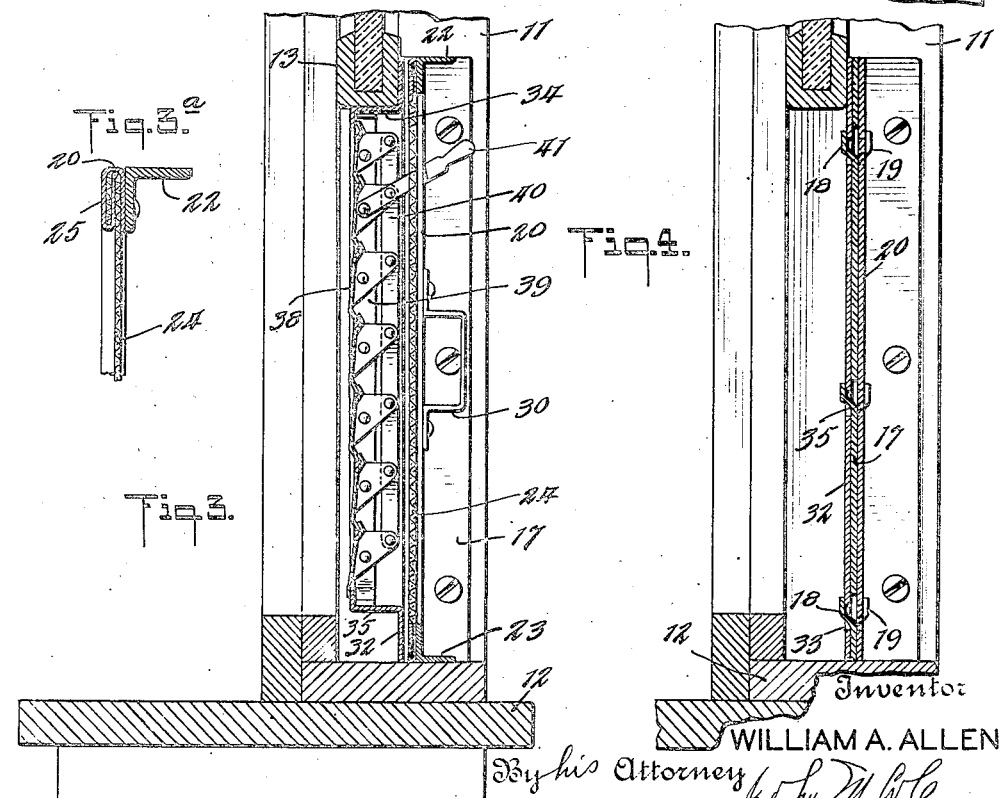

Dec. 29, 1931.  W. A. ALLEN  1,838,207
COMBINED SCREEN AND VENTILATOR
Filed Aug. 25, 1926   3 Sheets-Sheet 3
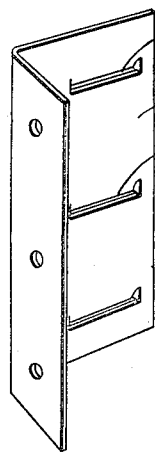
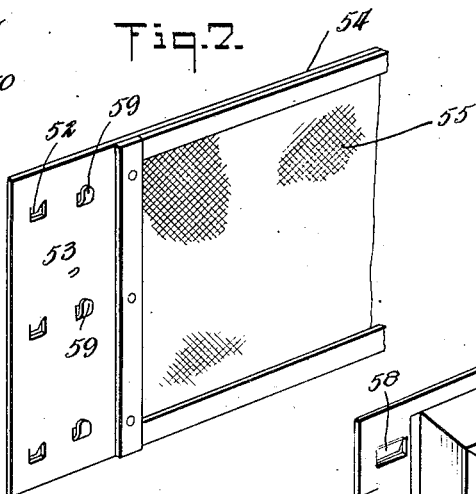
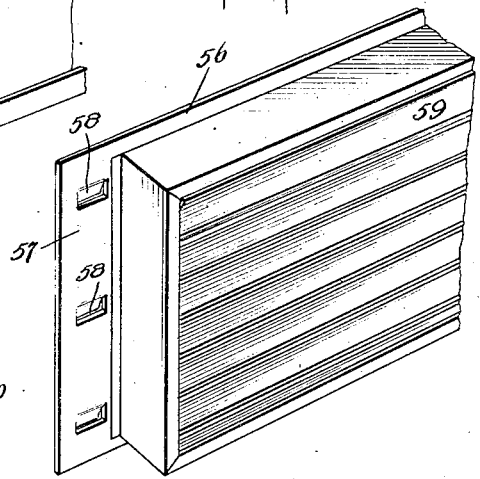
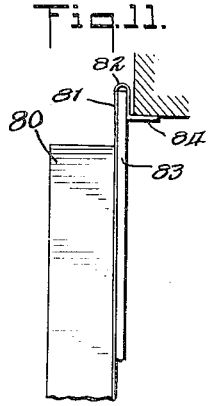
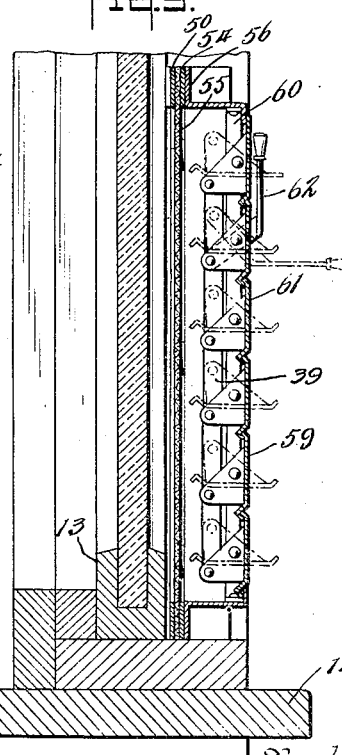
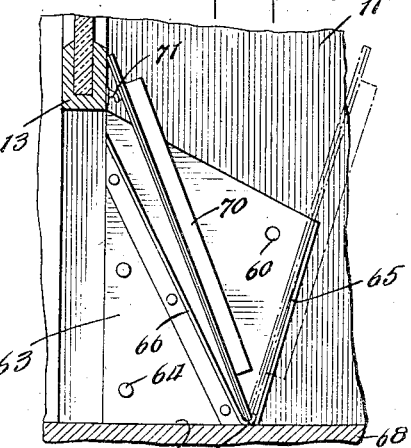
Inventor
WILLIAM A. ALLEN
By his Attorney Patented Dec. 29, 1931

1,838,207

UNITED STATES PATENT OFFICE

WILLIAM A. ALLEN, OF NEW YORK, N. Y.

COMBINED SCREEN AND VENTILATOR

Application filed August 25, 1926. Serial No. 131,406.

The present invention relates to combined screens and ventilators suitable for use in windows or other openings, wherein either the screen or the ventilator may be used separately or in combination, as desired.

The present invention contemplates the provision of an adjustable shutter which may be placed in a window frame or removed at will. The shutter is preferably made with an all metal frame and sheet metal slats and so arranged that the shutter may be adjusted from the room so as to vary the opening and direct the incoming air toward the ceiling. It also contemplates the provision of a screen supported adjacent the shutter and capable of use with or without the shutter.

The devices contemplated by the present invention are more particularly suited for use in clubs, hotels, offices, apartments, sleeping cars and parlor cars. They may be arranged to keep out insects, cinders, or the like, as well as to regulate the ventilation, prevent the rain from beating in through the window, and insure privacy. They may be readily removed by anyone.

The accompanying drawings show, for purposes of illustration, several of the many possible embodiments in which the present invention may take form, it being understood that the drawings are illustrative of the invention rather than limiting the same.

In these drawings:

Figure 1 is a horizontal sectional view through a window frame, taken on the line 1—1 of Figure 2 looking in the direction of the arrow; and showing both the screen and shutter in place;

Figure 1a is a fragmentary view of a detail;

Figure 2 is an elevational view taken from the inside of the room;

Figures 3 and 4 are vertical sectional views taken on the lines 3—3 and 4—4 respectively of Figure 2, looking in the direction of the arrows;

Figure 3a is a fragmentary view of a detail of the screen;

Figure 5 is a view similar to Figure 2 showing the shutter, the screen having been removed;

Figures 6, 7 and 8 are perspective views illustrating a modified form of supporting bracket, screen and shutter, respectively;

Figure 9 is a sectional view through a combined shutter and screen using the form shown in Figures 6, 7 and 8;

Figure 10 illustrates a modified supporting means for the forms of shutter and screen shown in Figures 1 to 9, inclusive; and Figure 11 is a fragmentary view of a further modification.

As shown in Figures 1 to 5, inclusive, the shutter and screen are carried on brackets or supports attached to the window frame, the screen being placed inside of the sash and the shutter being placed outside the screen and underneath the window sash. This form of construction will be first described.

The window frames are indicated at 10 and 11. The window sill is indicated at 12. The window sash 13 is adapted to be moved up and down along the sash grooves 14 and 15 as usual. Sheet metal brackets or supports 16 and 17 are mounted on the window frame members 10 and 11, and are so placed that the sash 13 may travel up or down without interference. As here shown, each of these supporting brackets is provided with prongs or projections 18 and 19. As indicated in the drawings, three outwardly extending projections 18 and three inwardly directed projections 19 are provided in each of the supporting brackets. These projections are punched out of the material of the bracket members and provide suitable means for supporting the shutter and the screen.

The screen includes a strip of sheet metal 20 of the proper size for the windows with which the screen is to be used. This sheet metal plate 20 is provided with a number of horizontal slots 21 in the ends thereof so arranged that the plate may be hooked in place on the projections 19. These slots are preferably made comparatively long so as to permit the use of the same plate in windows of varying widths. The sheet metal 20 is stiffened by angle shaped pieces of metal 22 and 23 placed across the top and bottom of the open center. A length of metal screen cloth 24 is placed over the opening in the screen frame and may be fastened in place in any convenient manner. As shown in Figure 3a, the upper and lower edges of the sheet metal 20 are folded over onto the edges of the screen cloth as indicated at 25 so as to securely grip the same. The ends of the screen cloth may be suitably fastened in place by straps 26 and 27, and, if desired, a central reinforcing strap 28 may be provided. Handles 29 and 30 fastened to straps 26 and 27 provide means for grasping the screen to remove it from the supports or replace it into position.

The shutter carrying member 31 is as here shown in the form of a flat sheet metal plate 32 of about the same size as the screen plate 20. The ends of the shutter plate 32 are provided with slots 33 similar to the slots 21 so that the shutter plate may be removably mounted on the external projections 18 carried by the supporting brackets. The shutter plate 32 is bent outwardly at the top and bottom as indicated at 34 and 35 to provide top and bottom walls of a shutter housing. The end walls 36 of the shutter housing are formed by Z-shaped pieces of sheet metal 37 which are fastened to the plate. A plurality of shutter slats 38 are pivotally mounted on fixed mounted supporting bars 39 fastened to the shutter housing. These shutters are also interconnected by a movable bar 40 so that they may be operated in unison. An operating handle 41 fastened to one of the shutter blades extends through a slot 42 in the screen plate 20 so as to be accessible for operating the shutter.

The window sash 13 may be moved down against the upper side 34 of the shutter housing, as indicated in Figure 3, thereby closing the passage against insects, cinders or rain. The shutter blades are so shaped that, when closed, they effectively shut off the air and prevent rain from beating into the room. One may move the shutter back and forth by means of handle 41 so as to adjust the shutter. It will be noted that the handle is moved down thereby bringing the shutter into a position to direct the incoming air upwardly as it enters the room. When it is desired to use the shutter only, the screen may be removed by grasping the handles and by lifting the screen off the supporting hooks 19. If one desires to use the screen only, the shutter is first removed and then the screen replaced. The shutter may be mounted on the projections 19, if desired.

According to the form of invention shown in Figures 6 to 9, inclusive, the shutter and screen are both carried inside the window sash so that the window may be raised or lowered without interference with the shutter. Here the supporting brackets 50, shown in Figure 6, are adapted to be fastened to the window frame in about the same manner as the brackets 16 and 17. These brackets each have rearwardly projecting prongs or louvres 51 struck out of the material of the bracket. Cooperative prongs 52 are struck out of the end members 53 of the screen frame 54. The louvres 51 are preferably comparatively long so that one size of screen frame may be used in various windows. The screen 55 is mounted in the screen frame 54 in any suitable manner. It will be obvious that the screen may be placed on the supports and that the window may be raised and lowered as desired.

The shutter frame 56 shown in Figure 8 is made somewhat the same as the shutter frame shown in Figures 1 to 5, inclusive. The end members 57 of the shutter plate are provided with louvres or projections 58 which are adapted to engage with projections 59 carried on the screen frame 53. The shutter slats or blades 59 are pivotally mounted in the shutter housing on supporting bars 60 and are interconnected by movable bars or rods 61. The shutter is operable by a handle 62 connected as indicated.

According to the form of construction shown in Figures 6 to 9, inclusive, one may mount the screen on the supporting brackets and may mount the shutter on the screen or the shutter may be mounted directly on the supporting bracket by passing the projections 58 down into the slots or louvres 51. One may raise or lower the window without interference with the screen or shutter. The shutter may be adjusted as desired.

As shown in the Figure 9, the slats are so arranged that the air is directed upwardly as it enters the room. Any rain would drain toward the outside without being driven into the room.

In many cases, windows are provided with inwardly projecting handles attached to the lower sash member. Where such handles are used, it is obvious that the screen supporting member must be such as to permit the raising and lowering of the window by these handles. Figure 10 shows a construction more particularly designed for use in such windows although it is applicable to windows with countersunk grips.

As shown in Figure 10, the supporting bracket 63 is in the form of a sheet metal plate which may be attached to the window frame 11 by means of screws 64. This supporting bracket has an oblique flange 65 placed on the inner side of the window frame. A sheet metal angle 66 is attached to the supporting bracket somewhat as indicated. The lower end 67 of the bracket member is preferably placed adjacent the window sill 68. The lower end of the angle 66 may be bent up to provide a bearing 69 as indicated. The flanges 65 and 66 form a V-shaped notch adapted to receive the ends of the shutter or screen. The flange 65 is so placed that the screen or shutter may be moved to the dotted line position where it will remain without a tendency to fall into the room, while the flange 66 is so placed that the screen will not fall out of the window.

When this type of construction is used, the screen or shutter or both (indicated by the reference character 70) is placed inside the window frame with its lower edge in the V-shaped notch or bearing 69 and with its upper edge along the lower member of the window sash. When it is desired to open the window, the shutter or screen, whichever is used, or both of them if they are used together, are moved to the dotted line position to permit one to grasp the handle of the window sash 71. After the window is raised to the desired height, the shutter and/or screen, rest against the window sash as indicated in full lines.

Figure 10 indicates the use of a shutter and screen constructed in the manner shown in Figures 6 to 9, inclusive, but it is obvious that the form shown in Figures 1 to 5 is also suitable for the type of bracket. In either case, the shutter may be adjusted by means of the handles as before indicated.

According to the modified form of the invention indicated in Figure 11, the shutter housing 80 is carried on a sheet metal plate 81 which is bent on itself as indicated at 82 to provide a longitudinal passage-way for the screen frame 83. The sheet metal plate which carries the shutter housing may be further bent outwardly as indicated at 84 to engage with the window sash.

It will be noted from the foregoing that the present invention provides a ruggedly reconstructed frame and shutter which may be used together or separately so as to control the air passing through an open window and to prevent the passage of insects, cinders and the like. It is also possible to insure ventilation. By the use of these screens or shutters or both of them, ventilation may be obtained without permitting curtains to blow out through the windows and become soiled or torn. The window may be left up and the shutter partly open without any tendency of the rain beating into the window or damaging furnishings.

It is obvious that the invention may be embodied in many forms and constructions, and I wish it to be understood that the particular forms shown are but several of the many forms. Various modifications and changes being possible, I do not limit myself in any way with respect thereto.

What is claimed is:

1. In combination, a ventilating shutter for windows, comprising a flat frame adapted to extend across the bottom of a window frame, a comparatively large opening in said frame, a shutter housing about said opening, a plurality of shutter slats carried in said housing, means for operating the shutter slats in unison, the frame having laterally extending end portions for supporting it in the window, a screen frame removably attached to the shutter frame, a screen carried by the screen frame and disposed across the opening therein, and means for supporting the screen frame and/or the shutter from the sides of the window frame.

2. A combined shutter and screen for windows, comprising plate supporting means, a sheet metal plate detachably carried by the plate supporting means and adapted to extend across a window frame below the sash, said plate having a rectangular opening extending across a substantial width of the window frame, a housing having side walls carried by the plate and disposed about the opening, a plurality of slats movably mounted in said housing to vary the flow of air therethrough, and a removably supported screen disposed across the opening and supported independently of the plate, whereby the shutter or screen may be used independently or combined.

3. A combined shutter and screen for windows, comprising a sheet metal plate adapted to extend across a window frame below the sash, said plate having a rectangular opening extending across a substantial width of the window frame, a housing having top and bottom walls integral with the plate and extending along the upper and lower edges of the opening and side walls fastened to the plate along the ends of the opening, a plurality of slats movably mounted in said housing to vary the flow of air therethrough, and a removably supported screen disposed across the opening and supported independent of the housing, the shutter slats being so placed that water will drain toward the outside of the window, the parts being so placed that the screen covers the opening in the shutter.

4. The combination with a window frame, or the like, of a shutter unit carrying a variable opening shutter and a screen unit carrying a screen, and means including supports carried by the window frame for independently supporting either the shutter unit or the screen unit in the window frame so that either or both may be removed at will, said means including devices carried by the screen unit and shutter unit for fastening them together independently of the supports carried by the window frame.

5. In combination, a window frame, a slidable window sash therein, a screen, shutter or the like extending across the lower part of the window frame, and means for supporting the same so that it may be rocked about its lower edge as an axis, said means being in the form of brackets, each having oblique flanges, the outer flange being so disposed as to support the screen in a position of rest away from the window sash, and the inner flange being so disposed as to prevent the screen from falling out of the window, the inner flange being shorter than the width of the device being supported so that said device may rest on the lower frame member of the sash.

6. A combined ventilating shutter and screen for windows comprising a rectangular housing carrying a plurality of shutter slats interconnected to be operated in unison, and laterally extending sheet metal ends for supporting the shutter from the window frame, a screen having a frame whose ends are alongside the metal ends of the shutter and screen material across the housing, said ends having cooperative projections struck out of the metal thereof for fastening the shutter and screen together.

WILLIAM A. ALLEN.